3,651,208
DENTIFRICE FOR PERIODONTIA PURPOSES
Frederick L. Lauster, Massillon, Ohio, assignor to Lafant Research Company, Canton, Ohio
No Drawing. Filed Dec. 14, 1970, Ser. No. 98,136
Int. Cl. A61k 7/16
U.S. Cl. 424—54
2 Claims

ABSTRACT OF THE DISCLOSURE

A dentifrice is provided which is particularly effective in creating an improved climate within the mouth for the treatment of inflamed periodontium or periodontal tissues, and is characterized by the inclusion therein of ingredients having bacteriostatic and fungicidal properties, including those which attack gram-positive and gram-negative bacteria, both the aerobic and anaerobic spirochetes, large virus and certain protozoa, in addition to exercising an antifungal activity in oral infections caused by *Candida albicans*. It also acts as a protective for irritated and inflamed mucous membranes and as an oral lavage, and assists in the removal of tenacious mucous.

---

Periodontia or periodontology is the division of dentistry which deals with diseases of the periodontal tissues or membranes, which diseases include vingivitis, peridontitis, or inflammation of the periodontal membrane, and periodontoclasia, or destructive degeneration of the periodontal tissues, bone tissue destruction and consequent loosening and loss of the teeth.

The main cause of periodontal disease is involved with the local environment of the mouth. This refers to irritants to the tissue such as: plaque (invisible patches of bacterial colonies) on the surface of the teeth, bacterial infection of the gingiva and periodontal soft tissues, causing acute and chronic gingivitis, calcareous deposits (tartar), food between the teeth and improper tooth brushing.

Various types of periodontal treatment have been used, including certain types of dentifrices, but such dentifrices have proven largely ineffective.

The present invention has, as its principal object, the provision of a dentifrice which is effective to create a better climate, within the mouth, for infected and inflamed periodontium or periodontal tissue.

Another object of the invention is to provide a dentifrice of the character described, which is effective to quickly bring under control severe gingivitis which is another term for periodontal disease), to allow operative intervention by a dentist and to aid in both pre-operative and post-operative care.

A further object of the invention is to provide a dentifrice of the character described, which can help prevent the first stage of periodontoclasia from gaining inroads to the deeper tissues, and provide a positive adjunct to periodontia therapy.

Other objects and advantages of the invention will become apparent in the course of the following description of the dentifrice.

The dentifrice, in accordance with the invention, consists of the following ingredients, in power form, in the proportion by weight indicated, the proportions being expressed in grams:

| | Range | Preferred |
|---|---|---|
| Dicalcium phosphate dihydrate | 77–87 | 82 |
| Sodium borate | 3–7 | 5 |
| Bismuth subcarbonate | 2–5 | 3.5 |
| Sodium lauroyl sarcosinate | 1–3 | 2 |
| Flavoring agents | 4–6 | 5 |
| Saccharin | .1–.5 | .3 |
| Aluminum dihydroxy allantoinate | .05–.15 | .1 |
| Allantoin proteinate | .05–.15 | .1 |
| Oxytetracycline hydrochloride | .50–1.50 | 1 |
| Nystatin | .50–1.50 | 1 |
| Total, percent | 100 | 100 |

Dicalcium phosphate dihydrate, also known as dicalcium phosphate, dibasic; dicalcium ortho phosphate; bicalcic phosphate, and secondary calcium phosphate, is a white, tasteless, odorless, crystalline powder having the formula $CaHPO_4 \cdot 2H_2O$, and is a polishing agent which is effective to impart a desired cleanliness to the teeth, as the result of continued use of the dentifrice. Moreover, its action is such that it helps to remove mechanically superficial plaque from the teeth without appreciable abrasion thereof.

Sodium borate, variously known as sodium tetraborate; sodium borate (2,4,7); sodium pyroborate, and borax is available in the form of white, odorless, crystals or powder, having the formula $Na_2B_4O_7 \cdot 10H_2O$, which functions as a non-irritating antiseptic and soothing agent in this dentifrice, assisting in the removal of tenacious mucous.

Bismuth subcarbonate, variously known as bismuth oxycarbonate; bismuth "carbonate," and bismuth carbonate, basic, is a white, colorless, tasteless powder, and is a gastrointestinal and oral or mucous membrane protectant.

Sodium lauroyl sarcosinate is available as a substantially anhydrous white powder and functions as a foaming agent and cleanser as well as an anti-enzyme, inhibiting the formation of acid in the mouth. Its action is relatively long-lived because of its strong adsorption on dental plaque.

Flavoring agents include one or more of the essential oils, which impart an acceptable and pleasing flavor to the dentifrice when used and leave a lasting pleasant after taste. These essential oils or flavors include menthol, oil of wintergreen, oil of peppermint and oil of spearmint.

Saccharin, in the small amount indicated, is a synthetic sweetening agent, usually used in conjunction with the flavoring agent.

Aluminum dihydroxy allantoinate (whose formula is $Al(OH)_2C_4H_5N_4O_3$, is a clean white powder which functions in this dentifrice to exert an effective healing, cleansing, soothing and anti-inflammatory activity, in the treatment of gingival irritatons, and is also an effective prophylactic compound. It also has the property of being mildly astringent and antacid. This astringency helps to reduce bleeding of soft gums and helps to toughen the gums. Its keratolytic (skin softening) action produces a desired cleansing effect. It has healing and non-irritant activity where there is abrasion, soreness or irritation due to external causes such as brushing, toothpicking, etc.

Allantoin proteinate, which is a modified allantoin protein, is an anti-irritant and cleansing agent.

Oxytetracycline hydrochloride is an antibiotic having activity against gram-positive and gram-negative bacteria, and is prophylactically and therapeutically effective against a wide range of infections caused by susceptible organisms.

Nystatin is an antibiotic with antifungal activity against a wide variety of yeasts and yeast-like fungi, and is highly effective for the treatment of oral infections.

The aforesaid dentifrice, in powder form, is preferably used by brushing it onto the teeth and gums for about one minute, then flushing the foam through the teeth for about two to three minutes and rinsing, using it three times per day until results conform to the dentist's treatment desires. This same procedure can be used before and after gingivectomy and other oral surgical treatments.

In general, the dentifrice attacks gram-positive and gram-negatvie bacteria, both the aerobic and anaerobic spirochetes, large virus and certain protozoa, in addition to exercising an antifungal activity for oral infections caused by *Candida albicans*. It acts as a protective for irritated and inflamed mucous membranes and as an oral lavage, and assists in the removal of tenacious mucus.

It is thus seen that I have provided a dentifrice which is eminently satisfactory to accomplish all of the aforesaid stated objectives.

It is understood that slight changes may be made in the formula or composition of the dentifrice as described, without departing from the spirit of the invention or the scope of the subjoined claims.

Having thus described my invention, I claim:

1. A dentifrice for periodontia purposes, consisting by weight of from 77 to 87% dicalcium phosphate dihydrate, 3 to 7% sodium borate, 2 to 5% bismuth subcarbonate, 1 to 3% sodium lauroyl sarcosinate, .1 to .5% saccharin, .05 to .15% aluminum dihydroxy allantoinate, .05 to .15 allantoin proteinate, .50 to 1.50% oxytetracycline hydrochloride, .50 to 1.50% nystatin, and 4 to 6% of flavoring agents.

2. A dentifrice for periodontia purposes, consisting by weight of about 82% dicalcium phosphate dihydrate, about 5% sodium borate, about 3.5% bismuth subcarbonate, about 2% sodium lauroyl sarcosinate, about .3% saccharin, about .1% aluminum dihydroxy allantoinate, about .1 allantoin proteinate, about 1% oxytetracycline hydrochloride, about 1% nystatin, and about 5% of a flavoring agent.

No references cited.

RICHARD L. HUFF, Primary Examiner

U.S. Cl. X.R.

424—55, 57